United States Patent

Mowry et al.

[15] 3,637,202
[45] Jan. 25, 1972

[54] SHEET-GRIPPING DEVICE

[72] Inventors: Harry E. Mowry; Louis A. Ricardo; Guy V. Carricato, all of Pittsburgh, Pa.

[73] Assignee: Miller Printing Machinery Co., Pittsburgh, Pa.

[22] Filed: May 14, 1970

[21] Appl. No.: 37,130

Related U.S. Application Data

[63] Continuation-in-part of Ser. No. 835,062, June 20, 1969.

[52] U.S. Cl. ............................................ 271/51, 101/409
[51] Int. Cl. ........................................................ B65h 5/14
[58] Field of Search ............... 271/51, 52, 53; 101/409, 408, 101/410; 346/138

[56] References Cited

UNITED STATES PATENTS

| | | | |
|---|---|---|---|
| 2,599,776 | 6/1952 | Peyrebrune | 101/409 |
| 3,151,552 | 10/1964 | Peyrebrune | 101/409 |
| 1,664,700 | 4/1928 | Nayer | 101/409 |
| 1,430,223 | 9/1922 | Evans et al. | 271/53 |

OTHER PUBLICATIONS

Appl. S.N. 835062, "Sheet Gripping Device," Mowry et al., filed June 20, 1969, allowed by Examiner Mar. 3, 1971

*Primary Examiner*—Joseph Wegbreit
*Assistant Examiner*—Bruce H. Stoner, Jr.
*Attorney*—Stanley J. Price, Jr.

[57] ABSTRACT

A sheet-gripping device includes a gripper assembly nonrotatably mounted on a gripper shaft. A link member rotatably supports the gripper shaft adjacent one end and is nonrotatably secured to an intermediate shaft adjacent the other end. A first cam follower lever is connected to the intermediate shaft and is arranged to oscillate the end of the link member supporting the gripper shaft. A second cam follower lever is nonrotatably connected to the gripper shaft and has a cam roller urged into abutting relation with a cam surface fixed on the cylinder. Movement of the link member by the first cam follower moves the gripper along a path similar to the cam surface against which the cam roller on the second cam follower is urged. The configuration of the cam members determines the path followed by the gripper assembly. The gripper assembly includes a lever with one end secured to the gripper shaft and a recessed portion in the other end. A gripper member has a gripper finger at one end and an oppositely extending connecting portion at the other end. A connecting member connects the connecting portion to the lever and a resilient member urges the gripper finger toward the lever member.

8 Claims, 9 Drawing Figures

PATENTED JAN 25 1972
3,637,202
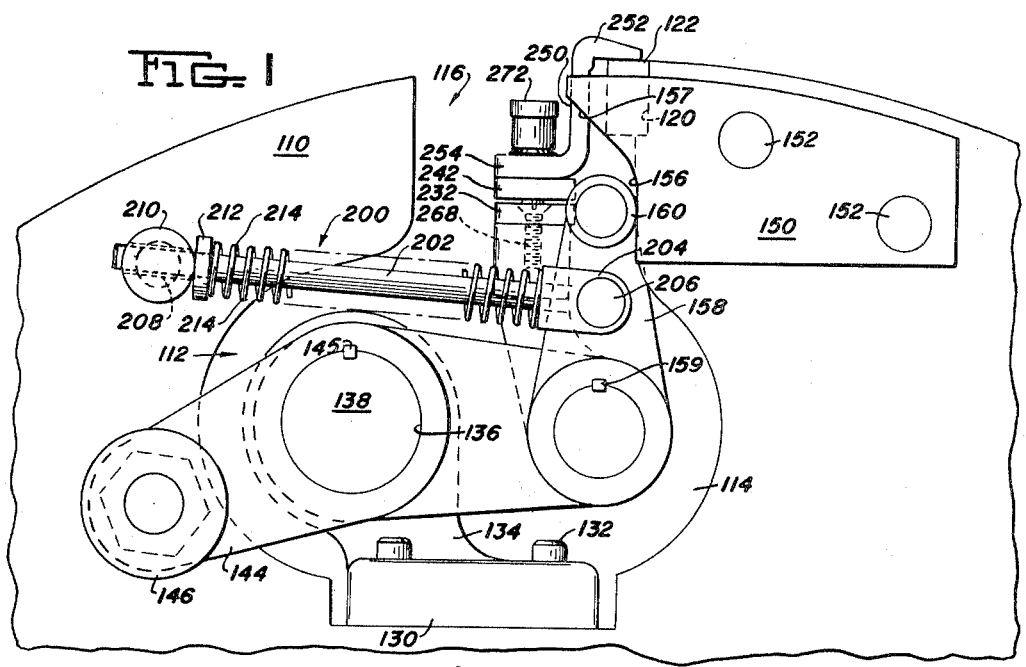
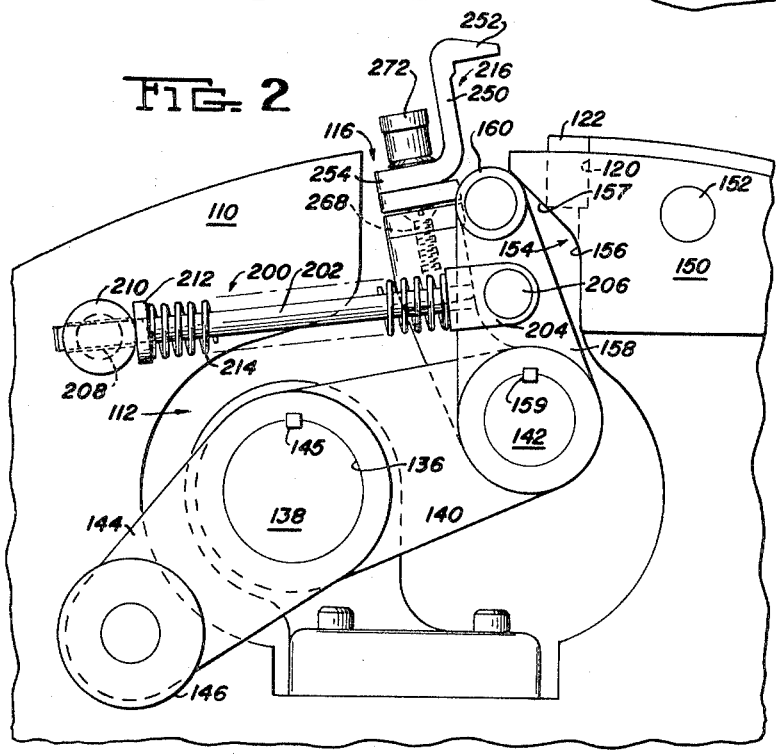
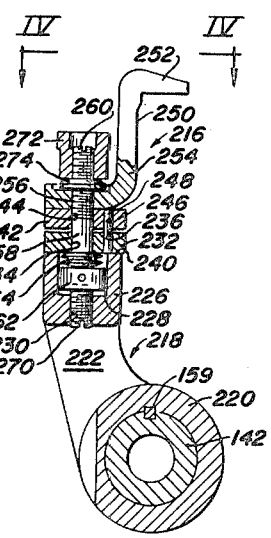
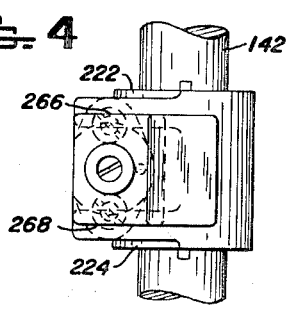
INVENTORS
HARRY E. MOWRY, GUY V. CARRICATO
and LOUIS A. RICARDO
Stanley J Price
their Attorney

SHEET-GRIPPING DEVICE

CROSS-REFERENCE TO RELATED APPLICATIONS

This application is a continuation-in-part of copending application entitled "Sheet-Gripping Device," Ser. No. 835,062, filed June 20, 1969.

BACKGROUND OF THE INVENTION

1. Field of the Invention

This invention relates to a sheet-gripping device and more particularly to a sheet-gripping device where, on opening and closing the gripper finger follows a path controlled by the cam surfaces.

2. Description of the Prior Art

The conventional sheet-gripping devices include gripper fingers that are nonrotatably secured to a gripper shaft. The gripper fingers are moved toward and away from the gripper pad by rotating the gripper shaft. The gripper fingers follow a circular path because of their direct connection to a rotatable gripper shaft that is fixed within the cylinder. U.S. Pat. Nos. 703,605; 1,275,002; 2,599,776; 2,775,197 and 3,151,552 disclose gripper devices that follow a circular path.

With known gripper devices, a wide longitudinal cylinder gap is required to accommodate the grippers. The large gap is a limiting factor in reducing cylinder diameters and press size. The problem of the large gap is discussed in U.S. Pat. No. 3,151,552 and a proposed solution therein is to encircle the hub clamping screw with the gripper spring to provide a concentric relation therebetween and thus reduce the lateral dimension of the gripper assembly and in turn, reduce the size of the cylinder gap.

SUMMARY OF THE INVENTION

Briefly, the invention is directed to a gripper device that moves perpendicular to the gripper pad upon closing and eliminates sheet movement upon engagement of the sheet between the gripper finger and pad. The gripper device permits a narrow cylinder gap so that the diameter of the cylinder and the press size can be reduced substantially.

The sheet gripper device includes a gripper assembly and means to open and close the gripper device. The gripper assembly includes a lever with one end secured to the gripper shaft and a recessed portion at the other end. A gripper member has a gripper finger at one end and an oppositely extending connecting portion at the other end. A connecting member connects the connecting portion to the lever and a resilient member urges the gripping member toward the lever member.

The actuating means for opening and closing either of the gripper assemblies includes a cam member having a cam surface fixedly positioned relative to the gripper pad. A cam follower abuts the cam surface and the cam follower is nonrotatably mounted on the gripper shaft. Means are provided to move the gripper shaft relative to the cylinder axis to thereby move the cam follower on the cam surface and also move the gripper finger along a path substantially parallel to the cam surface. The cam surface preferably has a configuration to move the gripper finger perpendicular to the outer surface of the gripper pad as the gripper finger closes against the gripper pad. With this arrangement, the gripper finger is moving perpendicular to the edge of the sheet as it is engaging the sheet between the gripper finger and gripper pad. This provides a final closing motion on the sheet that is perpendicular to the gripper pad and does not move the sheet along the cylinder upon closing and thereby, maintains registry. The cam configuration for moving the gripper member permits the longitudinal gap in the cylinder especially adjacent the external surface of the cylinder to be maintained as a relatively narrow gap so that it is possible to reduce both the cylinder diameter and the overall press size.

Accordingly, the principal object of this invention is to provide a sheet gripping device that requires a relatively narrow gap or opening in the cylinder periphery.

Another object of this invention is to provide a sheet gripping device wherein the gripper finger moves perpendicular to the sheet and gripper pad upon closing so that the gripper does not impart motion to the sheet on the cylinder during engagement of the sheet by the gripper.

These and other objects and advantages of this invention will be more completely disclosed and described in the following specification, the accompanying drawings and the appended claims.

BRIEF DESCRIPTION OF THE DRAWINGS

FIG. 1 is a fragmentary view in elevation of a cylinder illustrating the gripper assembly in a closed position.

FIG. 2 is a view similar to FIG. 1 illustrating the gripper assembly in an open position.

FIG. 3 is a fragmentary view in elevation and partially in section of the gripper assembly illustrated in FIGS. 1 and 2.

FIG. 4 is a top plan view taken along the lines IV—IV of FIG. 3.

DESCRIPTION OF THE PREFERRED EMBODIMENT

The gripper assembly is illustrated in FIGS. 1–4. The printing press cylinder and apparatus for opening and closing the gripper assembly is similar in many respects to the apparatus disclosed in copending application Ser. No. 835,062.

The cam member 150 is secured to one side of the cylinder 110 and does not extend across the gap 116 as the cam 50 illustrated in copending application, Ser. No. 835,062. The cam 150 is secured to the wall of cylinder 110 and has a cam surface generally designated by the numeral 154 with cam portions 156 and 157.

The cam roller 160 on the cam follower 158 is urged against the cam member 154 by an urging device generally designated by the numeral 200 that has a rod member 202 with an enlarged head portion 204. The head portion 204 is pivotally connected to the cam follower 158 by a pin member 206. The opposite end of the rod 202 extends through a longitudinal passageway 208 in a support member 210. The support member 210 is secured to the side wall of the cylinder 110 on the opposite side of the opening 116 from the cam member 150. The rod member 202 has an annular stop member 212 slidably positioned thereon. A spring member 214 is positioned around rod 202 and has one end portion abutting the stop member 212. The spring 214 is so constructed that it is under compression between the rod head portion 204 and stop member 212 to thereby urge the cam roller 160 on cam follower 158 against the cam surface 154.

The gripper assembly illustrated in FIGS. 1–4 is shown in detail in FIGS. 3 and 4 and is generally designated by the numeral 216. The gripper assembly 216 has a lever member generally designated by the numeral 218 with an end portion 220 nonrotatably secured to the gripper shaft 142 by a pin member 159. The lever member 218 has a pair of upstanding arm members 222 and 224 that terminate in an opposite end portion 226. The end portion 226 has a circular recessed portion 228 and a threaded passageway 230 opening into the recessed portion 228. A retaining or end plate 232 having axial passageway 234 and an offset pin receiving passageway 236 is positioned in overlying relation with the end wall 240 of the lever end portion 226. The retaining plate 232 is in overlying relation with the recessed portion 228 and the passageway 234 in plate 232 is aligned axially with the recessed portion 228. A nut plate 242 is positioned in overlying relation with end plate 232 and has an axial passageway 244 aligned with the axial passageway 234 in the retaining plate 228. The nut plate 242 has a similar pin passageway 246 positioned therein in aligned relation with the pin passageway 246 in retaining plate 232.

A pin member 248 extends through the aligned pin passageways 236 and 246 to maintain the two plate members oriented relative to each other. A gripper member 250 has an end gripper finger portion 252 and an oppositely extending other end portion 254. The oppositely extending end portion 254 has a passageway 256 therethrough that is aligned with the passageways 234 and 244 in plate members 232 and 242. A stud member 258 has a threaded end portion 260 and is positioned with one end in the recessed portion 228 and extending upwardly through the aligned passageways in the plate members and the end portion of gripper member 250. A collar 262 is secured to the stud member within the lever end recessed portion 228.

A plurality of annular Belleville springs 264 are positioned around the stud 258 between the collar 262 and the retaining plate 232. As illustrated in FIGS. 1, 2 and 3, the retaining plate 232 is secured to the end portion of lever 218 by screws 266 and 268. With this arrangement, the Belleville washers 264 urge the stud member 258 downwardly as viewed in FIG. 3. An adjusting screw 270 is threadly secured in the passageway 230 and abuts the collar 262 and underside of stud 258. The adjusting screw 270 is arranged to regulate the dimension between the gripper member finger portion 252 and the gripper shaft 142, as later explained.

The stud member 258 has a threaded portion 260 that extends beyond the gripper finger other end portion 254. A nut member 272 secures the gripper finger 250 to the stud 258. Belleville springs 274 are positioned between the end portion of gripper member 250 and the lock nut 272. With this arrangement a closing force is provided between the gripper finger portion 252 and the pad 122. This force may be increased or decreased by adjusting the nut 272 on the stud 258.

OPERATION

The gripper assembly illustrated in FIGS. 1–4 includes resilient means, i.e., Belleville springs or washers 264 between the stud 258 connected to the gripper member 250 and the retaining plate 232 connected to the lever member 218. With this arrangement, the set screw 270 is arranged to adjust the relative position of the gripper finger 252 to the gripper pad 122. Stated otherwise, the set screw 270 is arranged to initially set the gripper finger 252 against the gripper pad 122 and is arranged to compensate for the tolerances in the various elements of the gripper assembly and in the cylinder 110. To adjust the relative pressure of the gripper finger 252 against the pad 122, the lock nut 272 is utilized. The lock nut 272 urges the finger 252 against the pad 122 and compresses the Belleville washers 274 so that the fingers 252 are urged against the pad 122 with the opposing force exerted by the Belleville washers 274.

The sheet-gripping device previously described operates in the following manner. The gripper finger 252 is urged against the surface 122 of the gripper pad 120 and engages an edge of the sheet therebetween. This is the closed position for the gripper assembly 216. Rotation of the cylinder 110 relative to the fixed cam moves the cam roller 146 of cam follower 144 along a cam surface of a fixed cam. The cam surface is arranged to pivot the cam follower 144 about the shaft 138 in a clockwise relation as is described in greater detail in copending application, Ser. No. 835,062, filed June 20, 1969.

Rotation of the cam follower 144 in a clockwise direction transmits the rotation to intermediate shaft 138 which, in turn rotates the link member 140 in the same counterclockwise direction. The link member 140 is rotatably secured to the gripper shaft 142 and moves the gripper shaft axially in the same counterclockwise direction as the link 140, but because of the rotatable connection between the gripper shaft 142 and the link 140, the link permits the gripper shaft 142 to rotate about its own axis as it pivots above shaft 138. Thus the link member 140 functions to displace the gripper shaft 142 axially relative to the axis of cylinder 110.

The cam follower 158 is nonrotatably secured to the gripper shaft 142 and is also axially displaced with the gripper shaft 142 upon counterclockwise movement of the link member 140. Initial axial displacement of the link member 140 moves the gripper shaft 142 upwardly and, in turn, moves the gripper assembly 216.

Both the cam follower 158 and the gripper assembly 216 are nonrotatably secured to the gripper shaft 142 by means of key members. The cam roller 160 of the cam follower 158 is constrained to move according to the profile of the cam surface 157 to thus limit the axial rotation of the gripper shaft 142 so that the first movement of the gripper finger 252 is substantially perpendicular to the surface of the cylinder 110. With this arrangement, the initial opening movement of the gripper finger 252 is in a direction perpendicular to the surface of the pad 120.

Further rotation of the link member 140 displaces the gripper shaft so that the cam follower 160 has moved up onto another surface of the profile of cam surface 157. The movement of the cam follower 160 along the surface 157 rotates the cam follower 158 and the gripper shaft 142 nonrotatably secured thereto. The cam follower 158 thus rotates both the gripper shaft 142 and the gripper assembly 216.

The closing of the gripper finger 252 on pad 120 is similar to that disclosed in copending application, Ser. No. 835,062. The last closing movement of the gripper 252 against the gripper pad 20 is in a direction perpendicular to the surface of gripper pad 20 so that there is no relative circumferential movement or displacement of the sheet on the cylinder surface by the final closing movement of gripper finger 252.

According to the provisions of the patent statutes, the principle, preferred construction, and mode of operation of the invention have been explained, and what is considered to represent its best embodiments have been illustrated and described. However, it should be understood that, within the scope of the appended claims, the invention may be practiced otherwise than as specifically illustrated and described.

We claim:

1. A gripper assembly comprising,
    a lever having a first end portion arranged to be nonrotatably secured to a rotatably gripper shaft and a recessed other end portion,
    a plate member having an aperture therethrough positioned in overlying relation to said recessed portion,
    means securing said plate member to said lever member recessed other end portion,
    a gripper member having a laterally extending gripper finger at one end and an oppositely extending connecting portion adjacent the other end,
    said connecting portion having an aperture therethrough, said connecting portion positioned in overlying relation with said plate member with said aperture aligned with said plate member aperture,
    a connecting member extending into said recessed portion and through said apertures in said plate member and said gripper member connecting portion and securing said gripper member to said lever member, and
    said connecting member having resilient means urging said gripper member toward said lever member.

2. A gripper assembly as set forth in claim 1 which includes,
    a gripper shaft,
    said lever first end portion nonrotatably secured to said gripper shaft so that said lever member rotates with said gripper shaft,
    a gripper pad positioned in underlying relation with said gripper finger, and
    said resilient means urging said gripper finger into abutting relation with said gripper pad.

3. A gripper assembly as set forth in claim 1 in which,
    said connecting member has an enlarged first end portion in said recessed portion,
    said resilient means includes annular spring members positioned on said connecting member between said enlarged first end portion and said plate member to thereby urge said gripper finger connecting portion toward said plate member.

4. A gripper assembly as set forth in claim 3 in which,
    said lever recessed portion has a bottom wall with a threaded bore therethrough aligned with said connecting member enlarged first end portion, an adjusting member threadedly secured in said threaded bore and extending into said recessed portion,
said adjusting member operable to move said connecting member first enlarged portion toward said plate member against said resilient means.

5. A gripper assembly as set forth in claim 1 in which,
said connecting member has a threaded second end portion,
a nut member secured to said threaded second end portion and maintaining said gripper finger secured to said lever member.

6. A gripper assembly as set forth in claim 1 in which,
said connecting member has an enlarged second end portion, and
said resilient means includes annular spring members between said enlarged second end portion and said connecting member outer surface, said annular spring members urging said gripper finger connecting portion toward said plate member.

7. A gripper assembly as set forth in claim 1 in which,
said connecting member includes a stud member having a body portion with an enlarged first end portion and a threaded second end portion,
said stud member enlarged first end portion positioned in said recessed portion and said body portion extending through said apertures in said plate member and said gripper finger connecting portion, and
said resilient means including first annular spring members between said stud member enlarged first end portion and said plate member and second annular spring members between said gripper finger connecting portion and said nut member.

8. A gripper assembly as set forth in claim 7 in which,
said lever recessed portion has a bottom wall with a threaded bore therethrough aligned with said connecting member enlarged first end portion,
an adjusting member threadedly secured in said threaded bore and extending into said recessed portion with an end portion abutting said connecting member,
said adjusting member operable to move said connecting member axially against the first of said first annular spring members,
said nut member operable upon axial movement on said stud member to urge said gripper finger connecting portion toward said plate member.

* * * * *